(12) United States Patent
Taoka et al.

(10) Patent No.: US 12,198,467 B2
(45) Date of Patent: Jan. 14, 2025

(54) INFORMATION GENERATING APPARATUS, INFORMATION GENERATION METHOD, AND NON-TRANSITORY COMPUTER-READABLE RECORDING MEDIUM A STORING PROGRAM FOR PHOTOGRAPHING AND MARKING SKIN OF A PERSON IN AN IMAGE

(71) Applicant: Panasonic Intellectual Property Management Co., Ltd., Osaka (JP)

(72) Inventors: Hiroki Taoka, Kyoto (JP); Hiroshi Matsumoto, Kanagawa (JP); Ichiro Takei, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 487 days.

(21) Appl. No.: 17/511,609

(22) Filed: Oct. 27, 2021

(65) Prior Publication Data
US 2022/0051001 A1 Feb. 17, 2022

Related U.S. Application Data

(63) Continuation of application No. PCT/JP2020/011714, filed on Mar. 17, 2020.

(30) Foreign Application Priority Data

May 13, 2019 (JP) ................................. 2019-090605

(51) Int. Cl.
G06V 40/16 (2022.01)
(52) U.S. Cl.
CPC .......... *G06V 40/171* (2022.01); *G06V 40/162* (2022.01); *G06V 40/165* (2022.01)

(58) Field of Classification Search
CPC .. G06V 40/171; G06V 40/162; G06V 40/165; G06Q 50/10
See application file for complete search history.

(56) References Cited

U.S. PATENT DOCUMENTS

2018/0158191 A1 6/2018 Sasaki
2018/0260983 A1* 9/2018 Taoka ..................... G06Q 30/06
(Continued)

FOREIGN PATENT DOCUMENTS

JP 2001-216386 8/2001
JP 2002-221896 8/2002
(Continued)

OTHER PUBLICATIONS

International Search Report of PCT application No. PCT/JP2020/011714 dated Jun. 16, 2020.

*Primary Examiner* — Edward F Urban
*Assistant Examiner* — Wassim Mahrouka
(74) *Attorney, Agent, or Firm* — Greenblum and Bernstein, P.L.C.

(57) ABSTRACT

An information generating apparatus includes: an information managing unit that associates and manages an image obtained by photographing skin of a person, marking information indicating one or more markings that one or more operators perform with respect to one or more characteristic parts of skin in the image, and amendment information indicating amendment that a specialist makes to the marking information; and a marking-UI processing unit that superimposes and displays the one or more markings, indicated by the marking information, and the amendment, indicated by the amendment information, on the image.

9 Claims, 14 Drawing Sheets

(56) References Cited

U.S. PATENT DOCUMENTS

| | | |
|---|---|---|
| 2019/0005354 A1 | 1/2019 | Nakamura |
| 2019/0098149 A1* | 3/2019 | Shinoda .................. A45D 33/38 |
| 2019/0244408 A1* | 8/2019 | Nishi ........................ G06T 3/20 |

FOREIGN PATENT DOCUMENTS

| | | |
|---|---|---|
| JP | 2008-003724 | 1/2008 |
| JP | 2008-022154 | 1/2008 |
| JP | 2018-092351 | 6/2018 |
| JP | 2019-010411 | 1/2019 |

* cited by examiner

FIG. 3

| PERSON ID | FACE IMAGE | PHOTOGRAPHY DATE AND TIME | MARKING INFORMATION | AMENDMENT INFORMATION | MODIFICATION INFORMATION | CORRECT INFORMATION |
|---|---|---|---|---|---|---|

101

INFORMATION GENERATING APPARATUS, INFORMATION GENERATION METHOD, AND NON-TRANSITORY COMPUTER-READABLE RECORDING MEDIUM A STORING PROGRAM FOR PHOTOGRAPHING AND MARKING SKIN OF A PERSON IN AN IMAGE

BACKGROUND

1. Technical Field

The present disclosure relates to an information generating apparatus, an information generation method, and a non-transitory computer-readable recording medium storing a program.

2. Description of the Related Art

Studies are being conducted on various algorithms for automatically detecting spots, pores, and so on of skin of a person from an image obtained by photographing the skin. For example, Japanese Unexamined Patent Application Publication No. 2018-092351 discloses a technology in which a facial area of a person included in an image is divided into divided areas, brightness values are measured in the divided areas, and states of spots and pores in the facial area are determined based on a distribution state of the brightness values.

SUMMARY

In order to measure precision of an algorithm for detecting characteristic parts, such as spots and pores, from an image obtained by photographing skin of a person, correct information that accurately identifies the characteristic parts in the image is needed. It is difficult to fully automatically generate such correct information, and at least part of a process for generating the correct information includes work by a user.

One non-limiting and exemplary embodiment provides a technology for reducing the user's workload in the process for generating the correct information.

In one general aspect, the techniques disclosed here feature an information generating apparatus including: an information manager that associates and manages an image obtained by photographing skin of a person, marking information indicating one or more markings that one or more first users perform with respect to one or more characteristic parts of skin in the image, and amendment information indicating amendment that a second user makes to the marking information; and a marking-user-interface processor that superimposes and displays the one or more markings, indicated by the marking information, and the amendment, indicated by the amendment information, on the image.

According to the non-limiting embodiments in the present disclosure, it is possible to reduce a user's workload in a process for generating correct information.

It should be noted that general or specific embodiments may be implemented as a system, an apparatus, a device, a method, an integrated circuit, a computer program, a recording medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a table illustrating an example of management of information in an information managing unit according to the present embodiment;

DETAILED DESCRIPTION

Embodiments of the present disclosure will be described below in detail with reference to the accompanying drawings, as appropriate. However, an overly detailed description may be omitted. For example, a detailed description of already well-known things and a redundant description of substantially the same configurations may be omitted. This is to avoid the following description becoming overly redundant and to facilitate understanding of those skilled in the art.

The accompanying drawings and the following description are provided in order for those skilled in the art to fully understand the present disclosure, and these are not intended to limit the subject matter as recited in the claims.

<Example of Utilization of Information Generating Apparatus>

An information generating apparatus 100 is an apparatus for generating correct information accurately indicating the areas of spots in an image obtained by photographing the face of a person (this image is hereinafter referred to as a "face image"). Although a description will be given below using a face image as an example, the present embodiment is applicable to not only face images but also various images (e.g., an image of an arm and an image of a leg) obtained by photographing skin of a person. Also, although a description will be given below using spots as an example, the present embodiment is applicable to not only spots but also various characteristic parts (e.g., pores, wrinkles, bruises, and freckles) of skin. The correct information generated by the information generating apparatus 100 is useful to verify the precision of an algorithm for automatically detecting characteristic parts in an image obtained by photographing skin of a person.

Figure 1:
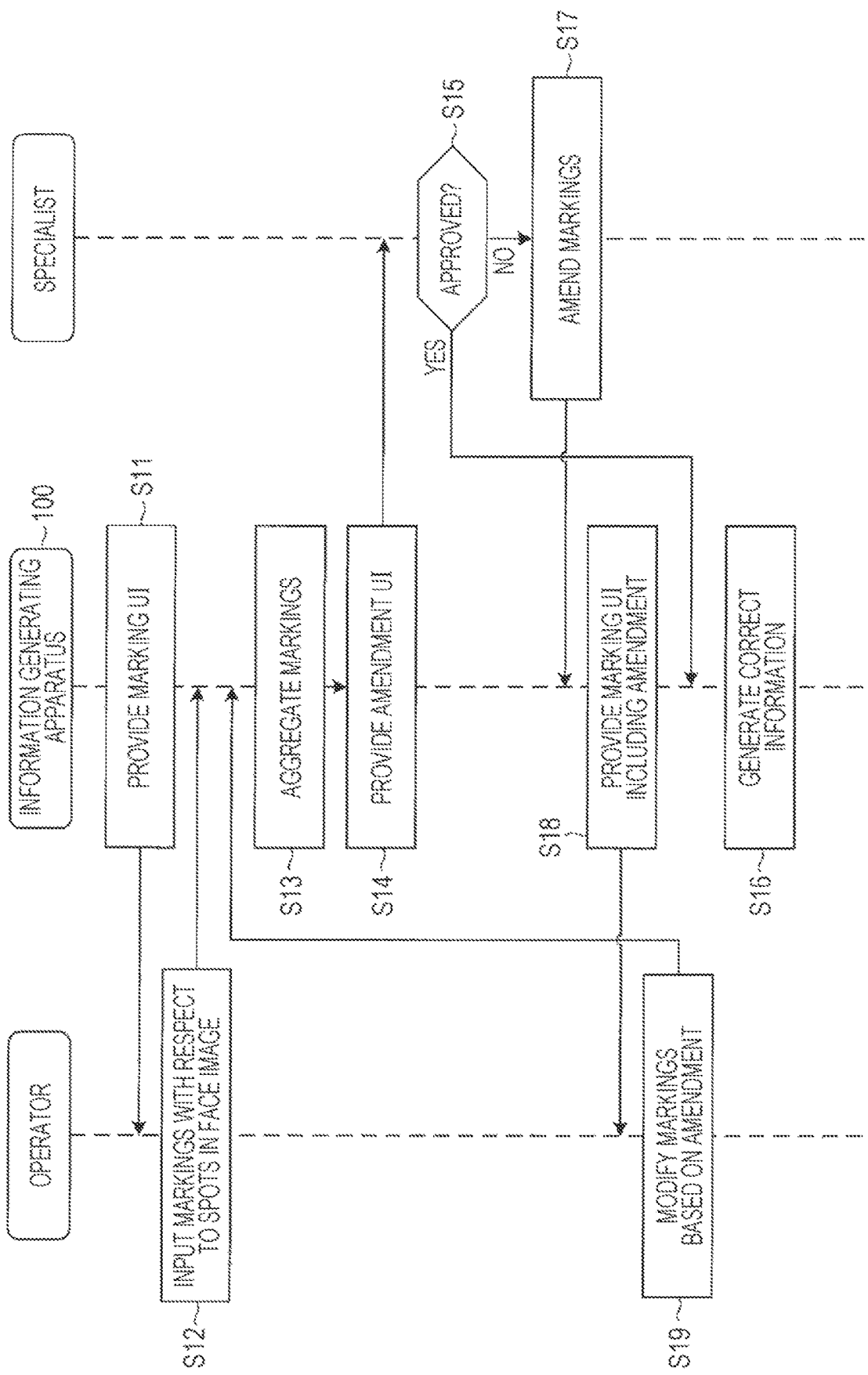
FIG. 1 is a chart for describing an example of utilization of an information generating apparatus according to an embodiment of the present disclosure.

An example of use of the information generating apparatus 100 will be described with reference to FIG. 1.

The information generating apparatus 100 provides a marking-user-interface (UI) 500 (see FIG. 6) to one or more operators, who are each one example of a first user, and receives inputs of markings with respect to spots in a face image (S11). Each operator does not necessarily have to be a skin specialist and may be, for example, an ordinary person who participates for an incentive, volunteering, or the like.

The operators each operate the marking UI 500 to input markings with respect to a face image of the same person (S12).

The information generating apparatus 100 aggregates the markings input by the individual operators (S13). For example, of the plurality of operators, the markings that are performed by a predetermined percentage or more of the operators are left, and the markings that are performed by fewer than the predetermined percentage of the operators are deleted. Details of the aggregation of the markings are described later (see FIG. 5).

The information generating apparatus 100 provides an amendment UI 600 (see FIG. 7) to a specialist, who is one example of a second user, and receives amendment made to the markings performed by the operators (S14). The specialist is a skin specialist who can accurately determine spots in a face image and may be, for example, a physician, a medical practitioner, or the like. The specialist may also be called an amender, an administrator, a supervisor, or the like.

Upon determining that the markings displayed in the amendment UI 600 accurately represent spots in the face image, the specialist approves the markings (YES in S15). In this case, based on the approved markings, the information generating apparatus 100 generates correct information (S16).

On the other hand, upon determining that the markings displayed in the amendment UI 600 do not accurately represent spots in the face image, the specialist operates the amendment UI 600 to amend the markings (S17). In this case, the information generating apparatus 100 provides a marking UI 500 including the amendment made in S17 to each operator and receives the operator's modification to the markings (S18).

Based on the amendment, each operator operates the marking UI 500 to modify the markings (S19). The markings modified by the operators are aggregated again (S13) and are provided to the specialist via the amendment UI 600 (S14). The markings to be aggregated may be only the modified markings.

The processes from S13 to S19 described above are repeated until the specialist gives approval (YES in S15), so that correct information accurately indicating spots in the face image can be generated. Also, according to the above-described processes, it is possible to generate correct information accurately indicating spots without making the specialist conduct the heavy-load work of accurately marking spots. A description will be given below in detail.

<Configuration of Algorithm Verification System>

Figure 2:
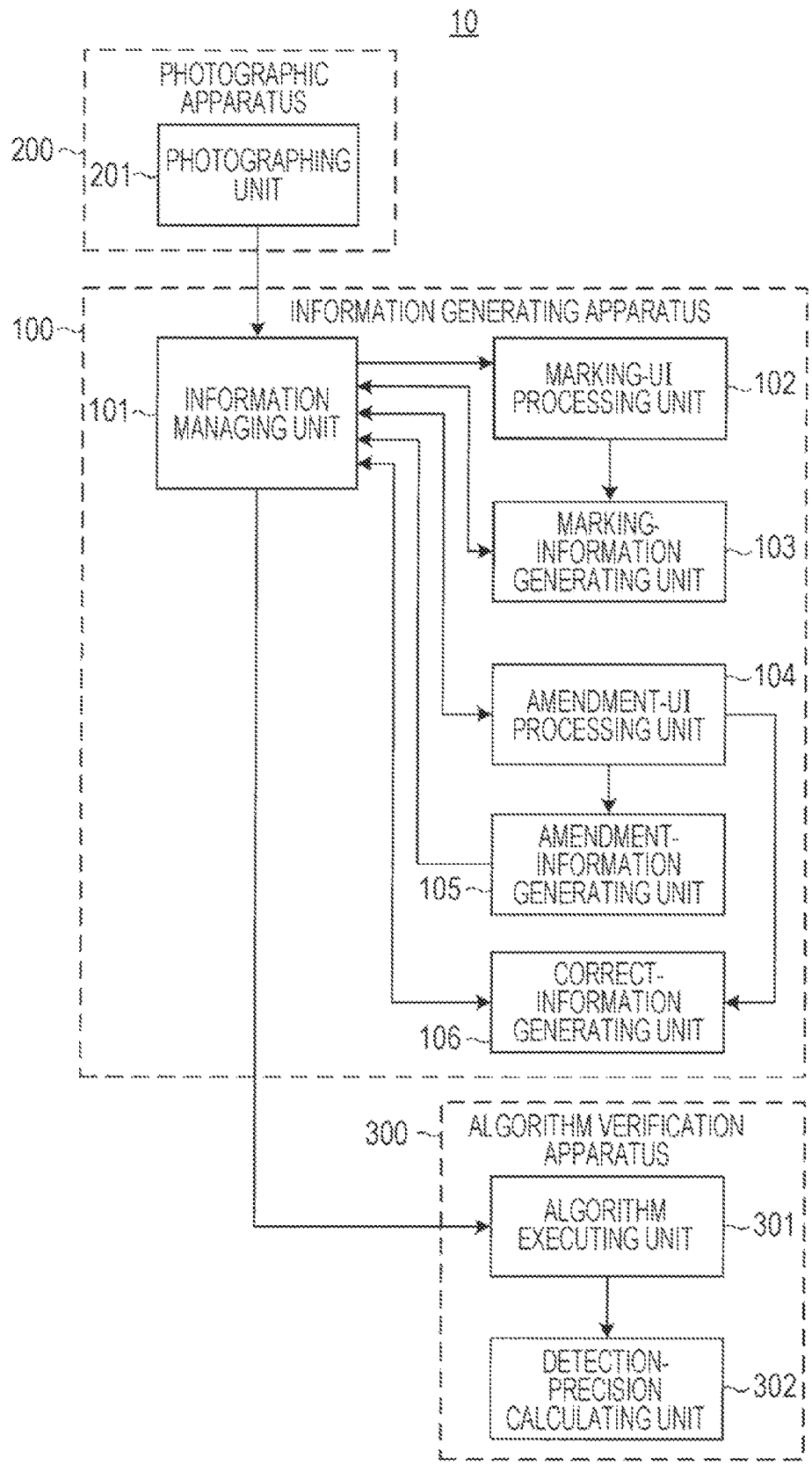
FIG. 2 is a diagram illustrating an example of the configuration of an algorithm verification system according to the present embodiment.

FIG. 2 illustrates an example of the configuration of an algorithm verification system 10. The algorithm verification system 10 includes a photographic apparatus 200, the information generating apparatus 100, and an algorithm verification apparatus 300.

<Photographic Apparatus>

The photographic apparatus 200 is, for example, a camera and includes a photographing unit 201. The photographing unit 201 photographs a person's face to generate a face image and stores the face image in an information managing unit 101 included in the information generating apparatus 100.

<Information Generating Apparatus>

The information generating apparatus 100 includes the information managing unit 101, a marking-UI processing unit 102, a marking-information generating unit 103, an amendment-UI processing unit 104, an amendment-information generating unit 105, and a correct-information generating unit 106.

Figure 4A:
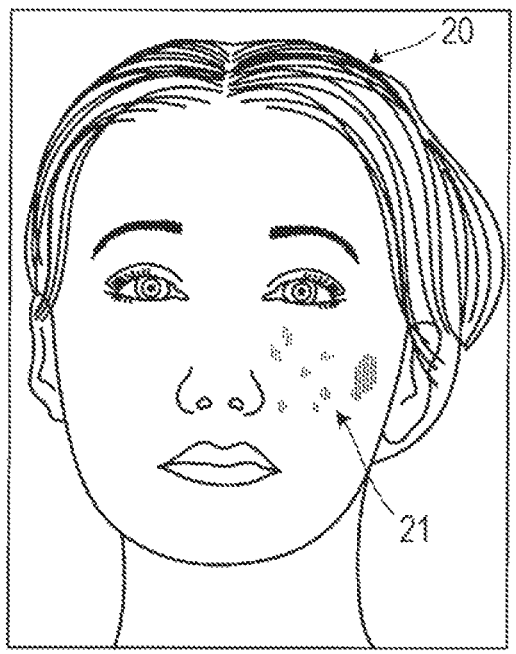
FIG. 4A is a view illustrating an example of a face image according to the present embodiment.

As illustrated in FIG. 3, the information managing unit 101 associates and manages a person identifier (ID), a face image, photography date and time, marking information, amendment information, modification information, and correct information. The person ID is information for identifying a person. As illustrated in FIG. 4A, the face image is a face image 20 of the person indicated by the person ID. The face image 20 may include spots 21. The photography date and time is date and time when the face image 20 is acquired.

Figure 4B:
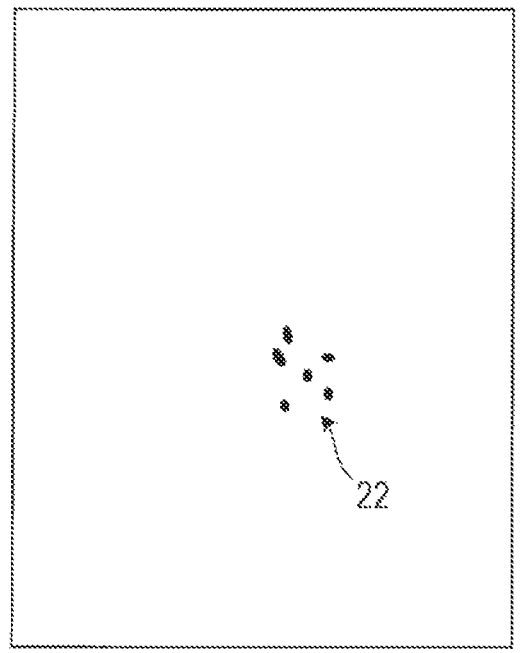
FIG. 4B is a view illustrating an example of markings according to the present embodiment.

As illustrated in FIG. 4B, the marking information indicates markings 22 that the operators input with respect to the spots 21 in the face image 20. The marking information may include identification information of the operators who input the markings 22 and/or date and time when the markings 22 are input.

Figure 4C:
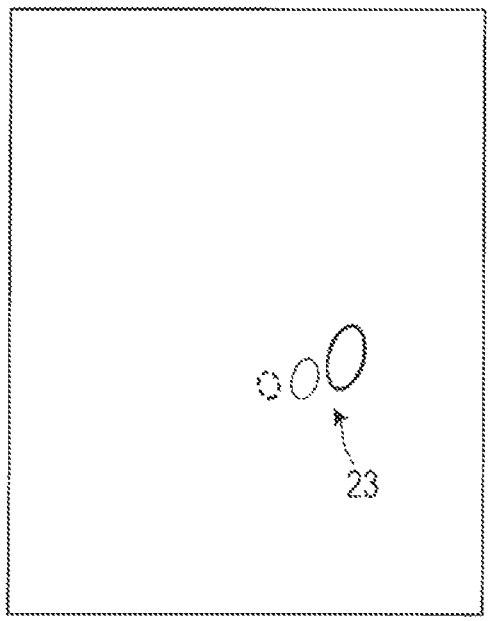
FIG. 4C is a view illustrating an example of regions of interest (ROIs) according to the present embodiment.

As illustrated in FIG. 4C, the amendment information is information indicating regions of interest (ROIs) 23 indicating ranges in which the markings 22 are amended by the specialist. The amendment information may include identification information of the specialist who makes the amendment and/or date and time when the amendment is made.

Figure 4D:
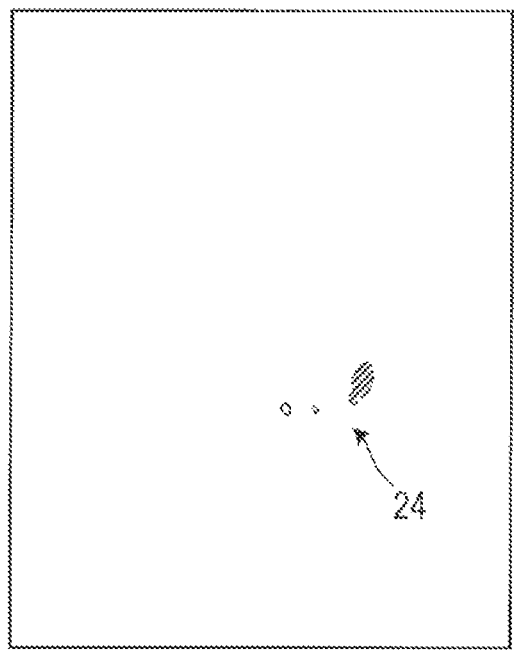
FIG. 4D is a view illustrating an example of modified markings according to the present embodiment.

As illustrated in FIG. 4D, the modification information indicates modified markings 24 that the operators input based on the ROIs 23. The modification information may include identification information of the operators who input the modified markings 24 and/or date and time when the modification is made.

Figure 4E:
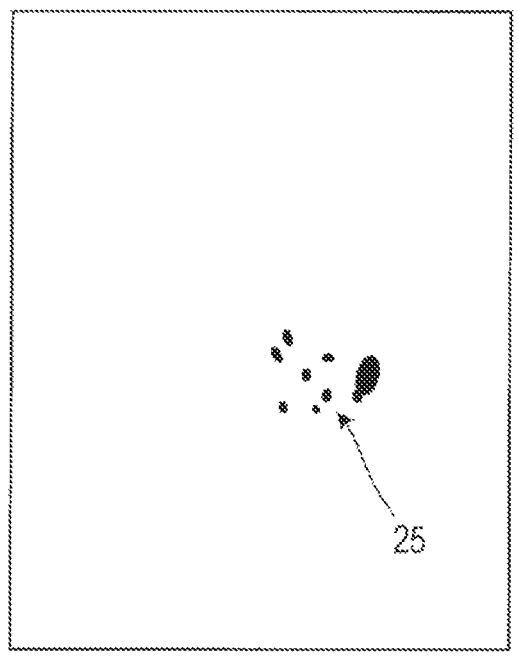
FIG. 4E is a view illustrating an example of correct markings according to the present embodiment.

As illustrated in FIG. 4E, the correct information indicates correct markings 25, which are accurate markings, with respect to the spots 21 in the face image 20. The correct information is generated based on the marking information and/or modification information approved by the specialist. The correct information may include the identification information of the specialist who makes the approval and/or date and time when the approval is made.

The marking-UI processing unit 102 provides the marking UI 500 for the operators to input the markings 22 with respect to the spots in the face image 20 and to input the modified markings 24 based on the ROIs 23 set by the specialist. For example, the marking-UI processing unit 102 obtains the face image 20 from the information managing unit 101 and displays the face image 20 in the marking UI 500. Then, the marking-UI processing unit 102 receives inputs of the markings 22 with respect to the spots 21 in the face image 20 from the operators.

For example, the marking-UI processing unit 102 obtains the face image 20, the marking information, and the amendment information, which are associated with each other, from the information managing unit 101 and superimposes and displays the markings 22, indicated by the marking information, and the ROIs 23, indicated by the amendment information, on the face image 20. Then, the marking-UI processing unit 102 receives inputs of the modified markings 24 in the ROIs 23 from the operators. Details of the marking UI 500 are described later (see FIGS. 6 and 8).

The marking-information generating unit 103 generates the marking information, based on the markings 22 input via the marking UI 500. At this time, the marking-information generating unit 103 may generate the marking information by aggregating the markings 22 input by the individual operators. Details of the aggregation of the markings are described later. The marking-information generating unit 103 stores the generated marking information in the information managing unit 101 in association with the face image 20. Also, the marking-information generating unit 103 generates the modification information, based on the modified markings 24 input via the marking UI 500. The marking-information generating unit 103 stores the generated modification information in the information managing unit 101.

The amendment-UI processing unit 104 provides the amendment UI 600 for the specialist to amend and approve the markings 22 in the face image 20. For example, the amendment-UI processing unit 104 obtains the face image 20 and the marking information, which are associated with each other, from the information managing unit 101 and superimposes and displays the markings 22, indicated by the marking information, on the face image 20. Then, the amendment-UI processing unit 104 receives amendment or approval as to the markings 22 from the specialist.

For example, the amendment-UI processing unit 104 obtains the face image 20, the marking information, the amendment information, and the modification information, which are associated with each other, from the information managing unit 101 and superimposes and displays the markings 22, indicated by the marking information, the ROIs 23, indicated by the amendment information, and the modified markings 24, indicated by the modification information, on the face image 20. Then, the amendment-UI processing unit 104 receives further amendment or approval as to the modified markings 24 from the specialist. Details of the amendment UI 600 will be described later (see FIGS. 7 and 9).

The amendment-information generating unit 105 generates the amendment information, based on the ROIs 23 input via the amendment UI 600. The amendment-information generating unit 105 stores the generated amendment information in the information managing unit 101 in association with the face image 20.

Based on the markings 22 and/or the modified markings 24 approved with the amendment UI 600, the correct-information generating unit 106 generates the correct markings 25. Then, the correct-information generating unit 106 generates the correct information, based on the correct markings 25, and stores the correct information in the information managing unit 101 in association with the face image 20.

<Algorithm Verification Apparatus>

The algorithm verification apparatus 300 includes an algorithm executing unit 301 and a detection-precision calculating unit 302.

The algorithm executing unit 301 executes an algorithm for automatically detecting the spots 21 from the face image 20 and outputs information indicating a result of the detection (the information is hereinafter referred to as "detection result information").

The detection-precision calculating unit 302 obtains the correct information, associated with the face image 20 used by the algorithm executing unit 301, from the information managing unit 101. By using the correct information, the detection-precision calculating unit 302 calculates a detection precision for detection result information output from the algorithm executing unit 301. The detection precision may be represented by, for example, accuracy, precision, recall, and/or F-measure in units of pixels that constitute the face image 20. This makes it possible to calculate precisions of both false negative detection and false positive detection. The detection precision may be calculated for the entire face image 20 or may be calculated for a predetermined range set in the face image 20.

Correct information that is accurate at a pixel level is required in order to verify the efficacy of medical treatment or skin care on a small skin-disorder portion, like a spot. Since the correct information is generated through amendment by a specialist who can accurately determine the spots 21 in the face image 20, the correct information is accurate at a pixel level. Hence, by using the correct information generated by the information generating apparatus 100, the algorithm verification apparatus 300 can accurately calculate the detection precision of an algorithm for detecting a small skin-disorder portion, like a spot.

<Aggregation of Markings>

An example of the aggregation of the markings will be described with reference to FIG. 5.

Figure 5:
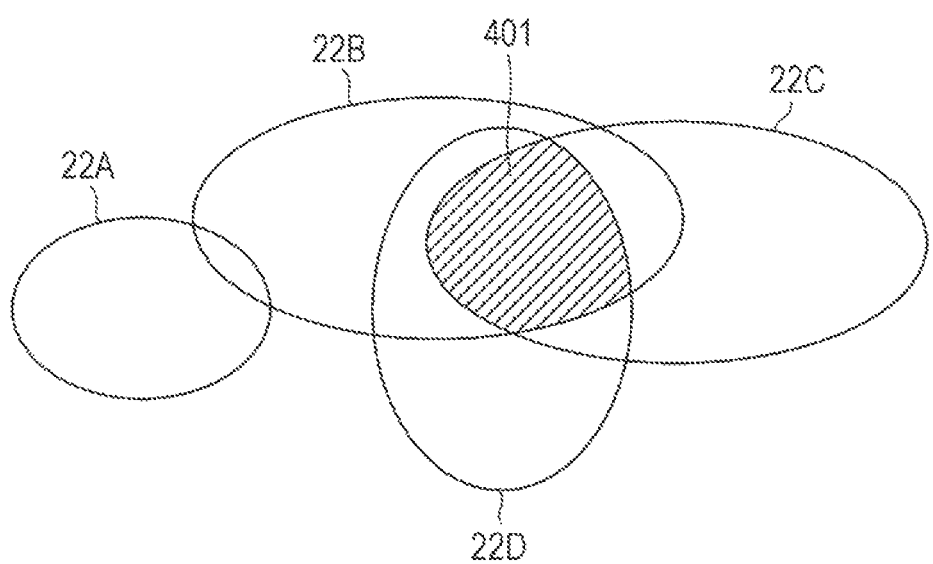
FIG. 5 is a diagram illustrating an example of aggregation of markings according to the present embodiment.

As illustrated in FIG. 5, by aggregating markings 22A, 22B, 22C, and 22D input by the respective individual operators, the marking-information generating unit 103 may generate, as the marking information, an area 401 marked by a predetermined percentage or more of the operators. The predetermined percentage may be, for example, arbitrarily set to 20%, 50%, 80%, or the like.

<Inputs of Markings>

Figure 6:
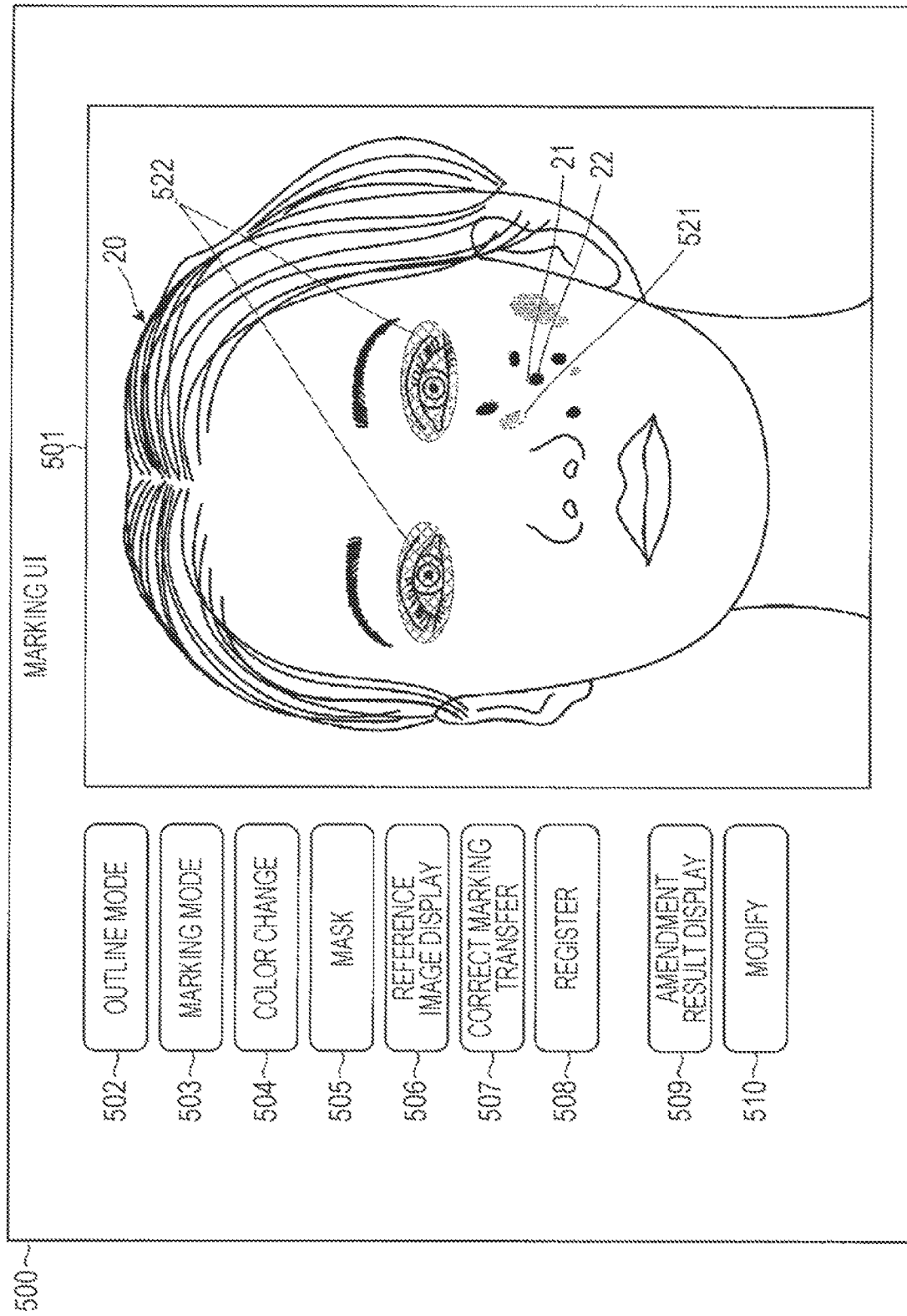
FIG. 6 is a view for describing inputs of markings by using a marking UI according to the present embodiment.

FIG. 6 illustrates one example of the marking UI 500. An example of inputs of the markings will be described with reference to FIG. 6.

The marking UI 500 has a work area 501, an outline mode button 502, a marking mode button 503, a color change button 504, a mask button 505, a reference-image display button 506, a correct-marking transfer button 507, a register button 508, an amendment-result display button 509, and a modify button 510.

The marking-UI processing unit 102 displays the face image 20 in the work area 501 and receives inputs of the markings 22 from the operators. For example, by using a stylus pen or a mouse, the operators input the markings 22 with respect to portions seemed to be the spots 21 in the face image 20.

When the outline mode button 502 is pressed (touched), the marking-UI processing unit 102 switches the work area 501 into an outline mode for inputting the outlines of the markings 22. In the outline mode, the inside of each input outline 521 is automatically marked (filled with color). The outline mode is useful in cases in which a spot having a large range is marked.

When the marking mode button 503 is pressed, the marking-UI processing unit 102 switches the work area 501 into a marking mode for directly inputting the markings 22. In the marking mode, a touched portion is marked (filled with color). The marking mode is useful in cases in which small spots are marked. In the marking mode, the size (e.g., the diameter of a circle that is filled with color) of each of the markings 22 may be able to be increased or reduced using a wheel of a mouse.

When the color change button 504 is pressed, the marking-UI processing unit 102 changes the color of the face image 20. Examples of the color changing include emphasis of a specific color, normalization based on a color standard deviation, unsharp masking, and gamma correction. For example, when it is difficult for one operator to distinguish between a spot and a shadow in the displayed face image 20, he or she can make the distinction by changing the color.

When the mask button 505 is pressed, the marking-UI processing unit 102 sets masks 522 in marking-prohibited areas (e.g., eye areas) in the face image 20. The marking-UI processing unit 102 may automatically set the masks 522, based on a result of facial-part recognition with respect to the face image 20. The marking-UI processing unit 102 may set the masks 522, based on setting performed by the specialist. The marking-UI processing unit 102 may receive an input of the masks 522 from the operators.

When the reference-image display button 506 is pressed, the marking-UI processing unit 102 displays, in another window, another face image of the same person in the face image 20 displayed in the work area 501. The other face image may be different from the displayed face image 20, for example, in lightness and/or an angle. Also, the other face image may be displayed in another window in alignment with the face image 20 displayed in the work area 501. For example, when one range in the face image 20 is displayed enlarged in the work area 501, the same range in the other face image may be displayed enlarged in another window. When it is difficult for one operator to distinguish between a spot and a shadow in the face image 20 displayed in the work area 501, he or she can make the distinction by referring to the other face image in the other window.

When the correct-marking transfer button 507 is pressed, the marking-UI processing unit 102 transfers correct markings 25, generated from the other face image of the same person, to the face image 20 displayed in the work area 501. In this case, the marking-UI processing unit 102 may transfer correct markings 25 in another face image having photography date and time that is the closest to that of the face image 20 displayed in the work area 501. This makes it possible to improve the work efficiency of the marking. Details of the transfer of the correct markings 25 are described later (see FIG. 11).

When the register button 508 is pressed, the marking-UI processing unit 102 outputs the markings 22, input with respect to the work area 501, to the marking-information generating unit 103. The marking-information generating unit 103 generates the marking information, based on the output markings 22, and stores the marking information in the information managing unit 101 in association with the face image 20.

Figure 8:
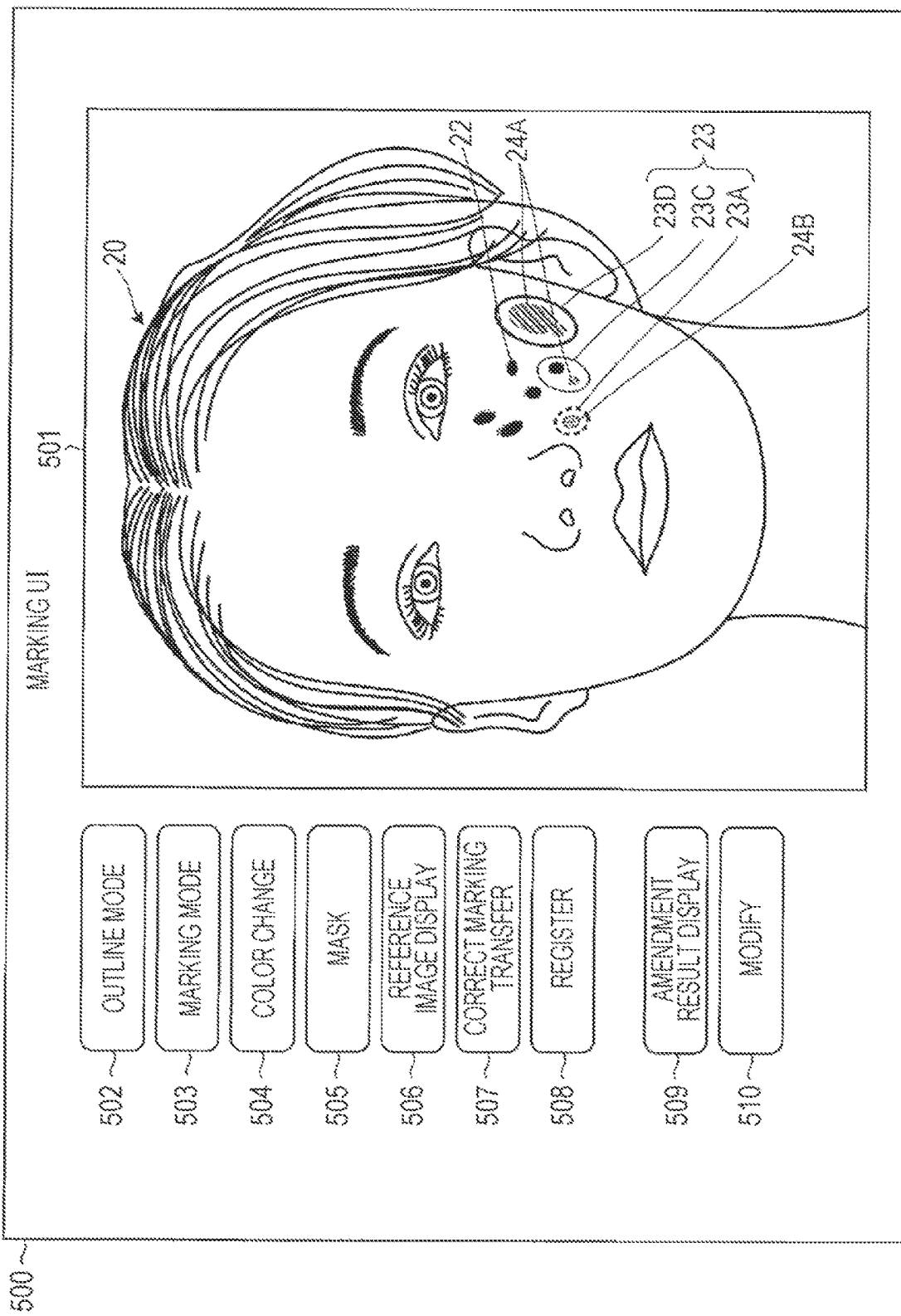
FIG. 8 is a view for describing modification to the markings by using a marking UI according to the present embodiment.

The amendment-result display button 509 and the modify button 510 are described later (see FIG. 8).

As described above, the marking UI 500 provides various functions for efficiently marking spots in a face image. Each operator can efficiently mark spots via the marking UI 500.

The marking UI 500 may display an image for practice in the work area 501, the image being used for each operator to practice spot marking. In this case, the marking UI 500 may superimpose and display markings pre-performed by the specialist on the image for practice.

<Amendment of Markings>

Figure 7:
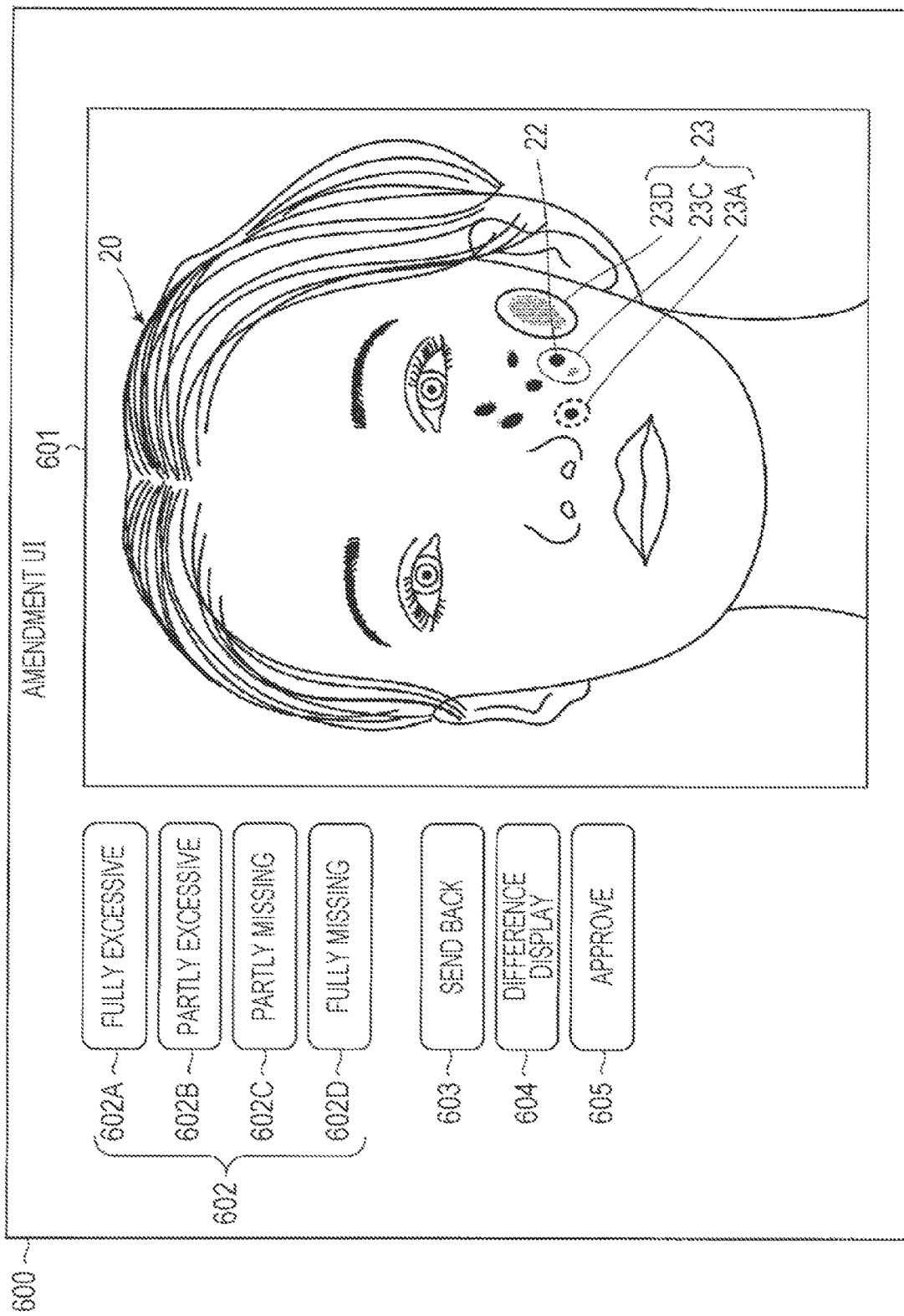
FIG. 7 is a view for describing amendment to the markings by using an amendment UI according to the present embodiment.

FIG. 7 illustrates one example of the amendment UI 600. An example of amendment of the markings will be described with reference to FIG. 7.

The amendment UI 600 has an amendment area 601, amendment reason buttons 602 (602A, 602B, 602C, and 602D), a send-back button 603, a difference display button 604, and an approve button 605.

The amendment-UI processing unit 104 obtains the face image 20 and the markings 22 in the marking information, which are associated with each other, from the information managing unit 101 and superimposes and displays the markings 22 on the face image 20. Then, the amendment-UI processing unit 104 receives setting of the ROIs 23 from the specialist. For example, by using a stylus pen or a mouse, the specialist sets the ROIs 23 for ranges indicated for modification of the markings 22.

The amendment reason buttons 602 are buttons for associating amendment reasons with the ROIs 23.

For example, when the specialist sets a ROI 23A for a range that is entirely marked regardless of absence of a spot and presses a "fully excessive" amendment reason button 602A, the amendment-UI processing unit 104 associates an amendment reason "fully excessive" with the ROI 23A.

For example, when the specialist sets a ROI 23 (not shown in FIG. 7) for a range where a portion that is not partly a spot is marked and presses a "partly excessive" amendment reason button 602B, the amendment-UI processing unit 104 associates an amendment reason "partly excessive" with the ROI 23.

For example, when the specialist sets a ROI 23C for a range where any of spots is not marked and presses a "partly missing" amendment reason button 602C, the amendment-UI processing unit 104 associates an amendment reason "partly missing" with the ROI 23C.

For example, when the specialist sets a ROI 23D for a range where no marking is performed regardless of presence of a spot and presses a "fully missing" amendment reason button 602D, the amendment-UI processing unit 104 associates an amendment reason "fully missing" with the ROI 23D.

The display format of each ROI 23 may differ, for example, in line shape, line thickness, and/or line color for each amendment reason so that the amendment reason associated with the ROI 23 can be distinguished at a glance. For example, as illustrated in FIG. 7, the ROIs 23C and 23D with which the amendment reasons as to the missing of markings are associated may be displayed with solid lines, and the ROI 23A with which the amendment reason as to the excess of markings is associated may be displayed with a dashed line. In this case, explanatory notes for the display formats of the ROIs 23 may be displayed in the amendment UI 600.

When the send-back button 603 is pressed, the amendment-UI processing unit 104 outputs the set ROIs 23 and the amendment reasons to the amendment-information generating unit 105. The amendment-information generating unit 105 generates amendment information including the output ROIs 23 and the amendment reasons and stores the amendment information in the information managing unit 101 in association with the face image 20.

Figure 9:
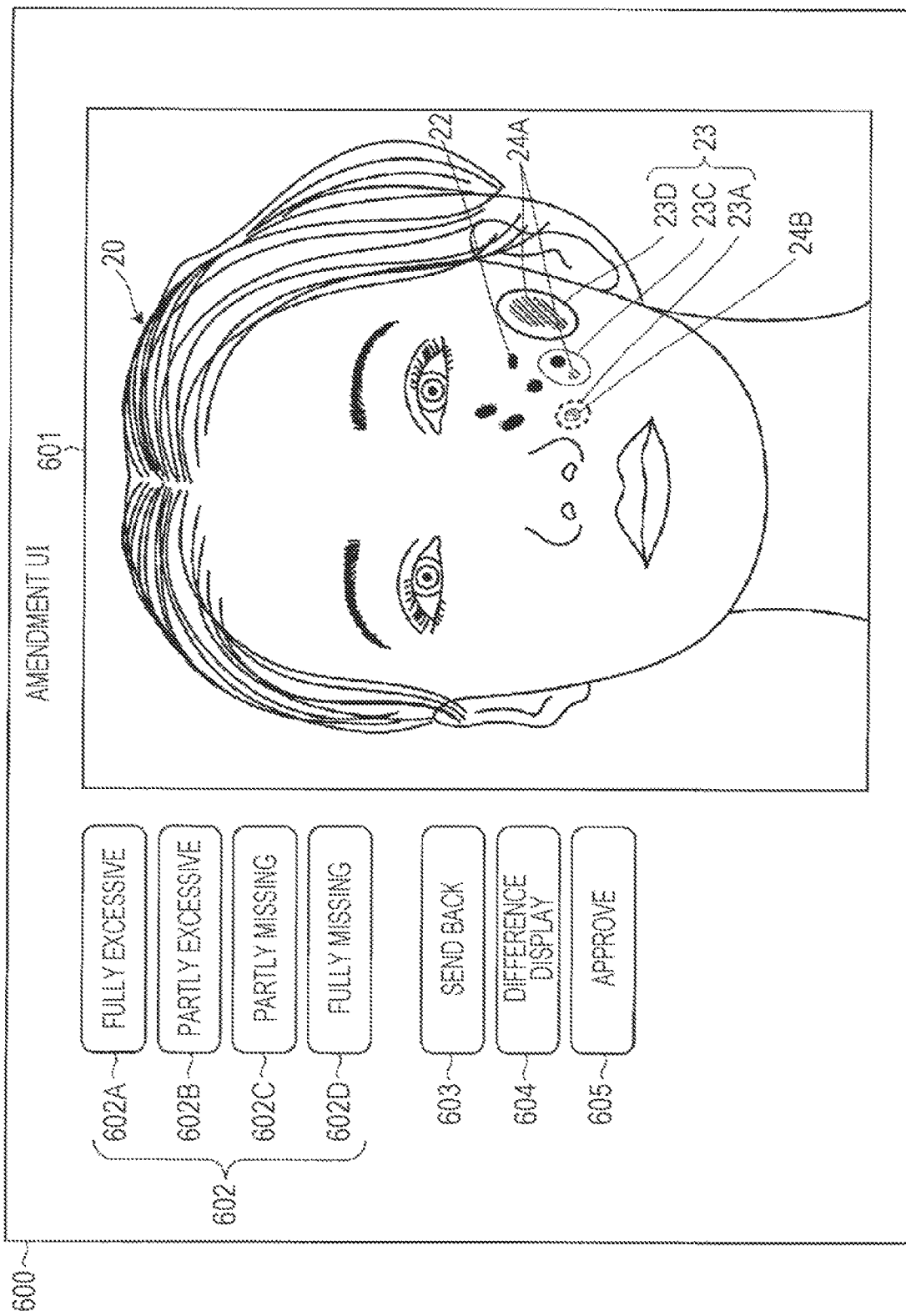
FIG. 9 is a view for describing approval of the markings by using an amendment UI according to the present embodiment.

The difference display button 604 and the approve button 605 are described later (see FIG. 9).

As described above, the amendment UI 600 provides various functions for efficiently amending the markings 22 performed by the operators. Hence, by operating the amendment UI 600, the specialist can efficiently amend the markings 22 performed by the operators.

Inputting of the amendment reasons is not limited to selective inputting using the amendment reason buttons 602 described above. For example, the amendment UI 600 may provide a function for inputting arbitrary amendment reasons for the ROIs 23.

<Modification of Markings>

An example of modification of the markings will be described with reference to FIG. 8. A marking UI 500 illustrated in FIG. 8 is similar to that illustrated in FIG. 6.

When the amendment-result display button 509 is pressed, the marking-UI processing unit 102 obtains the face image 20, the markings 22 in the marking information, and the ROIs 23 and the amendment reasons in the amendment information, which are associated with each other, from the information managing unit 101 and superimposes and displays the markings 22, the ROIs 23, and the amendment reasons on the face image 20. The operators input the modified markings 24 in the ROIs 23.

For example, the operators add modified markings 24A into the ROIs 23C and 23D for which the amendment reasons "partly missing" and "fully missing" are indicated respectively. In this case, the added modified markings 24A are displayed in the work area 501. The added modified markings 24A are displayed in a format different from that of the original markings 22.

For example, the operators delete at least one of the markings in the ROIs 23A and 23 for which the amendment reasons "fully excessive" and "partly excessive" are indicated respectively. In this case, a modified marking 24B indicating the deletion is displayed in the work area 401. The modified marking 24B indicating the deletion is displayed in a format different from that of the original marking 22.

When the modify button 510 is pressed, the marking-UI processing unit 102 outputs the modified markings 24 to the marking-information generating unit 103. The marking-information generating unit 103 generates modification information, based on the output modified markings 24, and stores the modification information in the information managing unit 101 in association with the face image 20.

Thus, it is sufficient for the operators to modify the insides of the ROIs 23 indicated by the specialist, thus making it possible to efficiently modify the markings.

<Approval of Marking>

An example of approval of the markings will be described with reference to FIG. 9. An amendment UI 600 illustrated in FIG. 9 is similar to that illustrated in FIG. 7.

When the difference display button 604 is pressed, the amendment-UI processing unit 104 obtains the face image 20, the marking information, the amendment information, and the modification information, which are associated with each other, from the information managing unit 101. Then, the amendment-UI processing unit 104 superimposes and displays the markings 22, indicated by the marking information, the ROIs 23 and the amendment reasons, indicated by the amendment information, and the modified markings 24, indicated by the modification information, on the face image 20.

When the approve button 605 is pressed, the amendment-UI processing unit 104 outputs the markings 22, the ROIs 23, and the modified markings 24 displayed in the amendment area 601 to the correct-information generating unit 106. Based on the output markings 22 and modified markings 24, the correct-information generating unit 106 generates the correct markings 25 (i.e., the correct information) and stores the correct markings 25 in the information managing unit 101.

Thus, it is sufficient for the specialist to check the modification that the operators make to the ranges for which the ROIs 23 are set, the specialist can efficiently check the modification of the operators.

<Feedback of Markings of Operators>

An example in which a difference between a marking 22 input by one operator and a correct marking 25 is fed back to the operator will be described with reference to FIG. 10.

Figure 10:
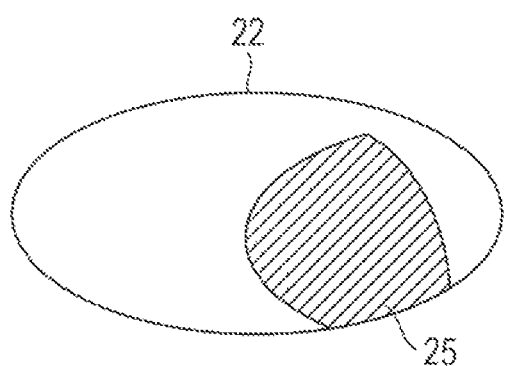
FIG. 10 is a view illustrating an example of superimposition and display of an operator's marking and a correct marking according to the present embodiment.

As illustrated in FIG. 10, after generation of the correct marking 25 is completed, the marking-UI processing unit 102 may superimpose and display the marking 22 input by the operator and the correct marking 25. In this case, the marking-UI processing unit 102 may feedback, to the operator as a score, whether or not the marking 22 input by the operator tends to be large or small relative to the correct marking 25. This allows the operator to recognize peculiarity of his or her marking 22 and to accurately mark the spots 21 from next marking.

<Transfer of Correct Markings to Another Face Image>

The aforementioned transfer of the correct markings 25 to another face image will be described in detail with reference to FIG. 11.

Figure 11:
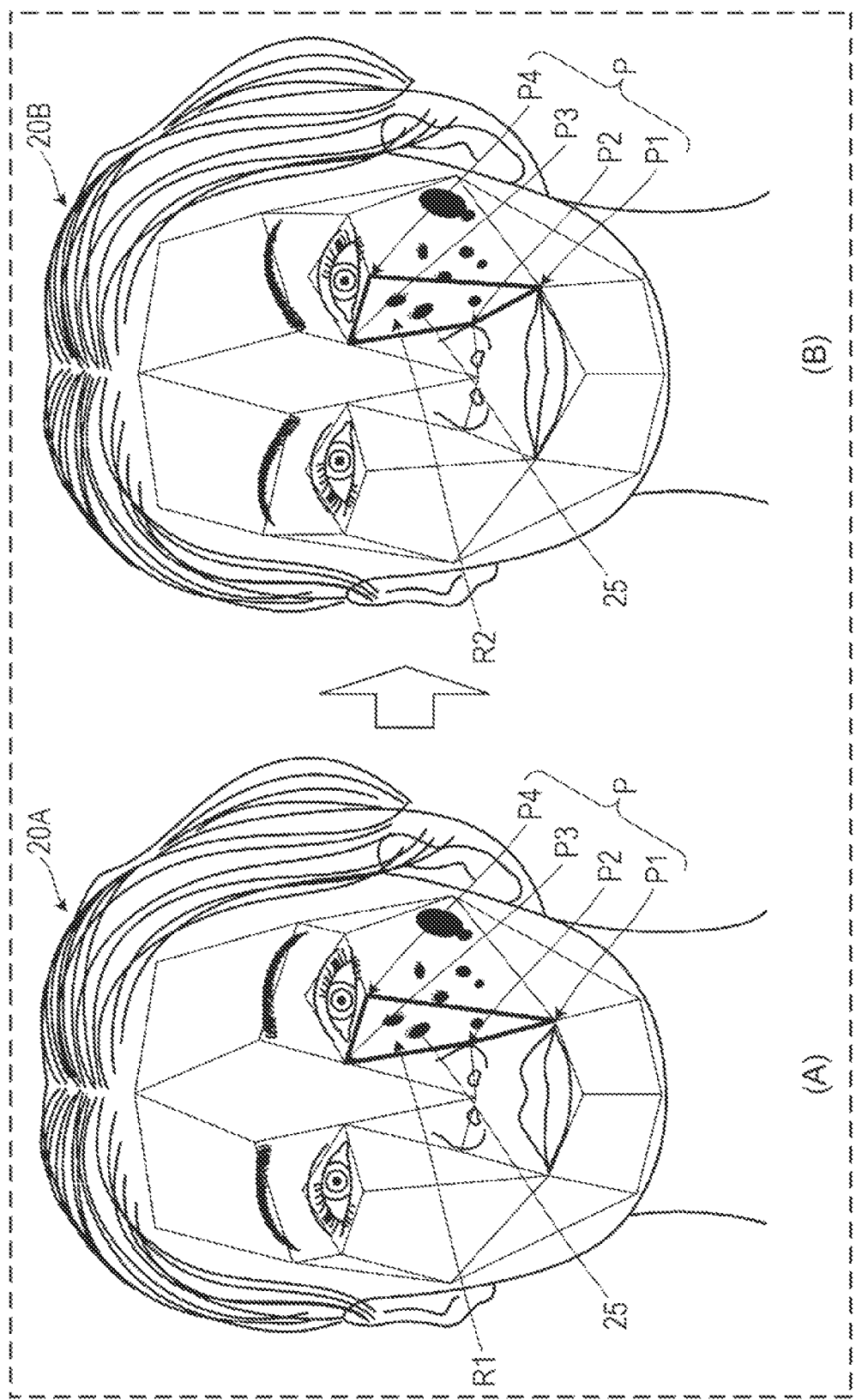
FIG. 11 illustrates views for describing an example of transfer of correct markings to another face image according to the present embodiment.

Performing predetermined facial recognition processing on a face image 20A allows facial feature points P (P1, P2, P3, and P4) to be identified in the face image 20A, as illustrated in FIG. 11.

As illustrated in FIG. 11(A), the correct markings 25 may be associated with a mesh area R1 defined by the facial feature points P1, P2, P3, and P4.

Associating the correct markings 25 with the mesh area R1, as described above, allows the correct markings 25 to be also transferred to another face image 20B of the same person. For example, the mesh area R1 illustrated in FIG. 11(A) and a mesh area R2 illustrated in FIG. 11(B) are defined by the same facial feature points P1, P2, P3, and P4. Hence, when the correct-marking transfer button 507 is pressed, the marking-UI processing unit 102 transfers (superimposes and displays) the correct markings 25, associated with the mesh area R1 illustrated in FIG. 11(A), to the mesh area R2 in the other face image 20B illustrated in FIG. 11(B). This allows the correct markings 25 to be transferred to, for example, generally correct positions of spots in the face image 20B in which a facial expression, a size, and so on are different.

<Modifications>

The configuration of the information generating apparatus 100 illustrated in FIG. 2 is one example. For example, the marking-UI processing unit 102 and the marking-information generating unit 103 may be configured in an apparatus (e.g., a personal computer (PC)) operated by each operator. The amendment-UI processing unit 104, the amendment-information generating unit 105, and the correct-information generating unit 106 may be configured in an apparatus (e.g., a PC) operated by the specialist. The information managing unit 101 may be configured in a server apparatus connected to the PCs, operated by the specialist and the operator, through a communications network. Alternatively, the information generating apparatus 100 may be a server apparatus connected to the Internet, the marking-UI processing unit 102 may provide the marking UI 500 to a browser used by the operator, and the amendment-UI processing unit 104 may provide the amendment UI 600 to a browser used by the specialist.

When markings input by a plurality of operators are aggregated, the marking-information generating unit 103 may correct peculiarity of the markings of each operator. The peculiarity of the markings of each operator may be determined based on differences between the markings input by the operator and the correct markings. Although the description in each embodiment has been given of a case in which the efficiency of the specialist's amendment is improved, the present disclosure is not limited thereto. In order to meet a client's request (e.g., his or her target of wishing to alleviate wrinkles to a certain degree), the present disclosure may be used to make a client's picture in his or her mind to the target and the specialist's picture in his or her mind to the target match each other. In this case, the matching of the pictures means, specifically, that a client (e.g., a patient) makes amendment to markings input by a specialist (e.g., a physician who is in charge of medical treatment) to thereby make the client's picture, which is the target, to match. For example, it is possible to indicate a client's desire of wishing to eliminate wrinkles at a certain portion or wishing to reduce the wrinkles to a certain degree.

<Summary of the Present Embodiment>

The information generating apparatus 100 according to the present embodiment includes: an information managing unit 101 that associates and manages an image obtained by photographing skin of a person, marking information indicating one or more markings that one or more first users (e.g., operators) perform with respect to one or more characteristic parts of skin in the image, and amendment information indicating amendment that a second user (e.g., a specialist) makes to the marking information; and a marking-UI processing unit 102 that superimposes and displays the one or more markings, indicated by the marking information, and the amendment, indicated by the amendment information, on the image. Each characteristic part of the skin may include any of a spot, a pore, and a wrinkle of the skin. Also, a difference between two present and current face images (e.g., a change in cheek sag), not the characteristic parts of the skin, may be detected. Also, object recognition (e.g., detection of a corroded part of an object) may be performed.

With this configuration, since the face image, the one or more markings performed by the first user, and the amendment that the second user makes to the one or more markings are superimposed and displayed, the first user can easily recognize the amendment that the second user makes to the one or more markings input by the first user.

The marking-UI processing unit 102 may receive, from the first users, inputs of the markings with respect to the image. The information generating apparatus 100 may further include the marking-information generating unit 103 that generates marking information by aggregating the markings input from the first users. With this configuration, since the markings input from the first users are aggregated, the precision with which the marking information indicates each characteristic part of the skin improves, compared with a case in which one first user inputs markings.

The information managing unit 101 may manage modified-marking information indicating modification that is based on the amendment and that is made to the one or more markings performed by the first user. The information generating apparatus 100 may further include the correct-information generating unit 106 that generates correct information indicating one or more markings (e.g., correct markings) with respect to the one or more characteristic parts of the skin in the image, based on the marking information and the modified-marking information, when the second user gives approval. With this configuration, since the correct information is generated using the one or more markings modified based on the amendment, it is possible to generate correct information in which the one or more characteristic parts of the skin are accurately marked.

The marking-UI processing unit 102 may display a difference between the one or more markings indicated by the marking information and the one or more markings (e.g., the correct markings) indicated by the correct information. With this configuration, since a same point and a different point between the one or more markings input by the first user and the one or more markings indicated by the correct information become apparent, the first user can recognize peculiarity of his or her marking and can accurately mark characteristic parts of the skin from next marking.

The information generating apparatus 100 may further include: the amendment-UI processing unit 104 that superimposes and displays the one or more markings, indicated by the marking information, on the image and that receives amendment to the one or more markings from the second user; and the amendment-information generating unit 105 that generates the amendment information, based on the received amendment. With this configuration, since the one or more markings input by the first user are superimposed and displayed on the face image, the second user can easily amend the one or more markings performed by the first user.

The amendment information may include information indicating an amendment range (e.g., a ROI) and an amendment reason, and the marking-UI processing unit 102 may display the amendment range in a format different for each amendment reason. With this configuration, since the display format of the amendment range differs when the amendment reason differs, the first user can easily recognize the amendment reason for the amendment range, based on a difference in the display format of the amendment range.

The marking-UI processing unit 102 may deform a second face image that is of the same person and that is different from the first face image into a shape that fits a face included in the first face image and may display the deformed second image. With this configuration, since the second face image is displayed in a format that conforms with the first face image, the first user can easily compare a characteristic part of the skin in the first face image with the second face image.

The marking-UI processing unit 102 may superimpose and display one or more markings (e.g., correct markings) indicated by correct information for a second face image on the first face image, the second face image being of the same person and being different from the first face image. With this configuration, since the correct markings are superimposed and displayed on the first face image, the first user can efficiently perform marking on the first image by referring to the correct markings.

While the embodiment according to the present disclosure has been detailed above with reference to the accompanying drawings, the functions of the photographic apparatus 200, the information generating apparatus 100, and the algorithm verification apparatus 300 described above can be realized by a computer program.

Figure 12:
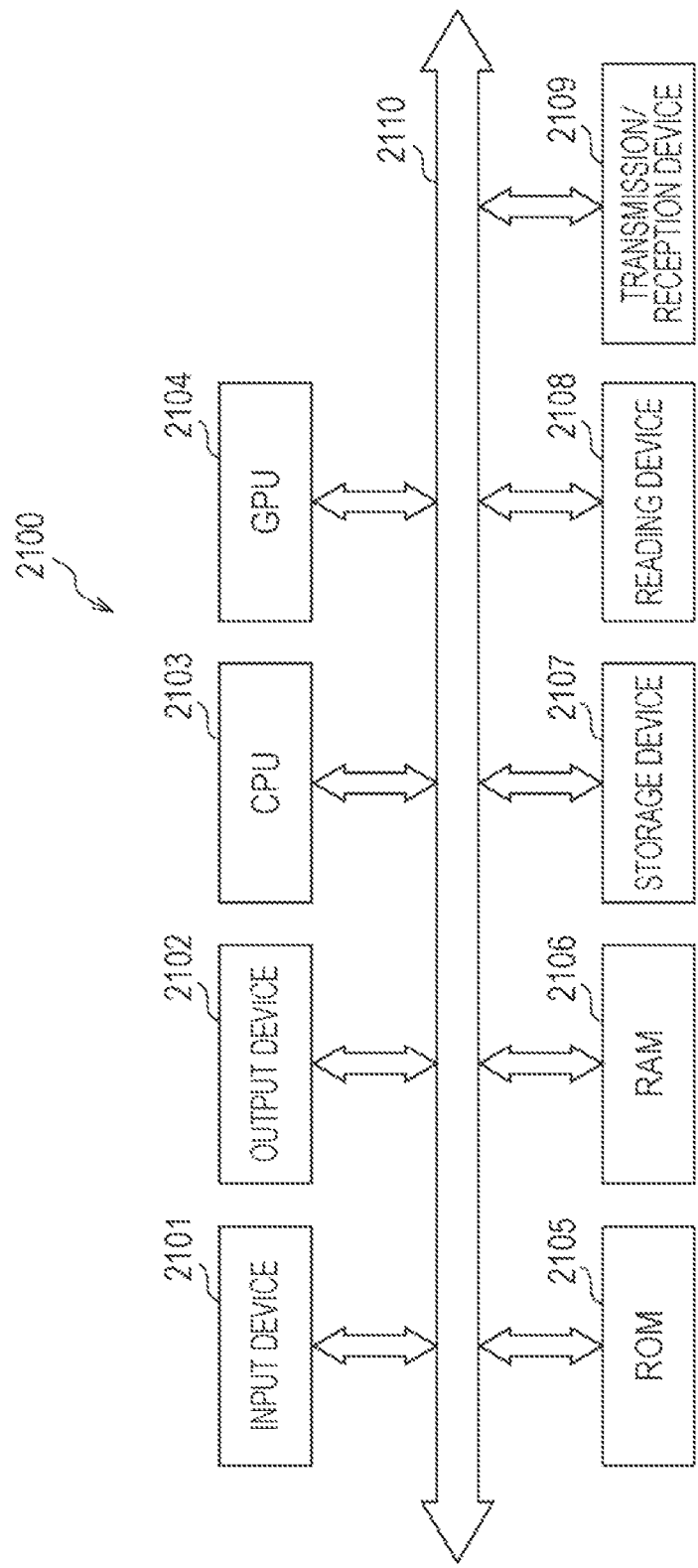
FIG. 12 is a diagram illustrating one example of a hardware configuration according to another embodiment of the present disclosure.

FIG. 12 is a diagram illustrating a hardware configuration of a computer that realizes functions of each apparatus by using a program. A computer 2100 includes: an input device 2101, such as a keyboard, a mouse, a stylus pen, and/or a touchpad; an output device 2102, such as a display or a speaker; a central processing unit (CPU) 2103; a graphics processing unit (GPU) 2104; a read-only memory (ROM) 2105; a random-access memory (RAM) 2106; a storage device 2107, such as a hard-disk device or a solid-state drive (SSD); a reading device 2108 that reads information from a recording medium, such as a digital versatile disk read-only memory (DVD-ROM) or a Universal Serial Bus (USB) memory; and a transmission/reception device 2109 that performs communication through a network. These individual portions are connected through a bus 2110.

The reading device 2108 reads a program for realizing the functions of each apparatus described above from a recording medium in which the program is recorded and causes the program to be stored in the storage device 2107. Alternatively, the transmission/reception device 2109 communicates with a server apparatus connected to a network and causes the program for realizing the functions of each apparatus described above, the program being downloaded from the server apparatus, to be stored in the storage device 2107.

Then, the CPU 2103 copies the program, stored in the storage device 2107, to the RAM 2106, sequentially reads instructions included in the program from the RAM 2106, and executes the instructions to thereby realize the functions of each apparatus described above.

The individual functional blocks used in the description of the above embodiments are typically implemented as a large-scale integration (LSI) circuit. These functional blocks may be individually realized by single chips or may be realized by a single chip so as to include some or all of the functional blocks. Although the functional blocks are realized by an LSI in this case, they may also be called an IC, a system LSI, a super LSI, or an ultra LSI depending on a difference in the degree of integration.

Also, a scheme for the circuit integration is not limited to LSI and may be realized by a dedicated circuit or a general-purpose processor. A field-programmable gate array (FPGA) that can be programmed after manufacture of an LSI or a reconfigurable processor that allows reconfiguration of connections and settings of circuit cells inside an LSI may be utilized.

In addition, when a technology for circuit integration that replaces LSI becomes available with the advancement of semiconductor technology or another derivative technology, such a technology may also naturally be used to integrate the functional blocks. Application of biotechnology or the like is possible.

One aspect of the present disclosure is useful to generate information for verifying a detection algorithm.

What is claimed is:

1. An information generating apparatus, comprising:
   a processor; and
   a memory including a program that, when executed by the processor, causes the processor to perform functions, the functions including:
   controlling an image obtained by photographing skin of a person, marking information indicating one or more markings that one or more first users perform with respect to one or more characteristic parts of the skin in the image, and amendment information indicating an amendment that a second user makes to the marking information; and
   superimposing and displaying the one or more markings, indicated by the marking information, and the amendment, indicated by the amendment information, on the image,
   wherein the processor receives, from the one or more first users, inputs of a plurality of markings with respect to the image,
   the processor generates one piece of the marking information by aggregating the plurality of markings input from the one or more first users,
   the image comprises a first face image of the person, and
   the processor deforms a second face image that is of the person and that is different from the first face image into a shape that fits a face included in the first face image and displays the deformed second face image.

2. The information generating apparatus according to claim 1,
   wherein the processor manages modified-marking information indicating a modification that is based on the amendment and that is made to the one or more markings performed by the one or more first users, and
   the processor generates correct information indicating one or more markings with respect to the one or more characteristic parts of the skin in the image, based on the marking information and the modified-marking information, when the second user gives approval.

3. The information generating apparatus according to claim 2,
   wherein the processor displays a difference between the one or more markings indicated by the marking information and the one or more markings indicated by the correct information.

4. The information generating apparatus according to claim 1,
   wherein the processor that superimposes and displays the one or more markings, indicated by the marking information, on the image receives the amendment to the one or more markings from the second user, and
   the processor generates the amendment information, based on the received amendment.

5. The information generating apparatus according to claim 1,
   wherein the amendment information indicates an amendment range and an amendment reason, and
   the processor displays the amendment range in a format different for each amendment reason.

6. The information generating apparatus according to claim 2,
   wherein
   the processor superimposes and displays the one or more markings indicated by the correct information for the second face image on the first face image.

7. The information generating apparatus according to claim 1,
   wherein the one or more characteristic parts of the skin comprise any of a spot, a pore, and a wrinkle of the skin.

8. An information generation method, comprising:
   causing an apparatus to associate and manage an image obtained by photographing skin of a person, marking information indicating a marking that at least one first user performs with respect to a characteristic part of the skin in the image, and amendment information indicating an amendment that a second user makes to the marking information;
   causing the apparatus to superimpose and display the marking, indicated by the marking information, and the amendment, indicated by the amendment information, on the image; and
   causing the apparatus to receive, from the at least one first user, inputs of a plurality of markings with respect to the image, wherein the apparatus generates one piece of the marking information by aggregating the plurality of markings input from the at least one first user, the image comprises a first face image of the person, and the apparatus deforms a second face image that is of the person and that is different from the first face image into a shape that fits a face included in the first face image and displays the deformed second face image.

9. A non-transitory computer-readable recording medium storing a program that causes a computer to execute:

associating and managing an image obtained by photographing skin of a person, marking information indicating a marking that at least one first user performs with respect to a characteristic part of the skin in the image, and amendment information indicating an amendment that a second user makes to the marking information;

superimposing and displaying the marking, indicated by the marking information, and the amendment, indicated by the amendment information, on the image;

receiving, from the at least one first user, inputs of a plurality of markings with respect to the image; and generating one piece of the marking information by aggregating the plurality of markings input from the at least one first user, wherein the image comprises a first face image of the person, and the computer deforms a second face image that is of the person and that is different from the first face image into a shape that fits a face included in the first face image and displays the deformed second face image.

* * * * *